No. 638,641. Patented Dec. 5, 1899.
W. McAUSLAND.
TEA KETTLE, &c.
(Application filed Aug. 4, 1899.)
(No Model.)
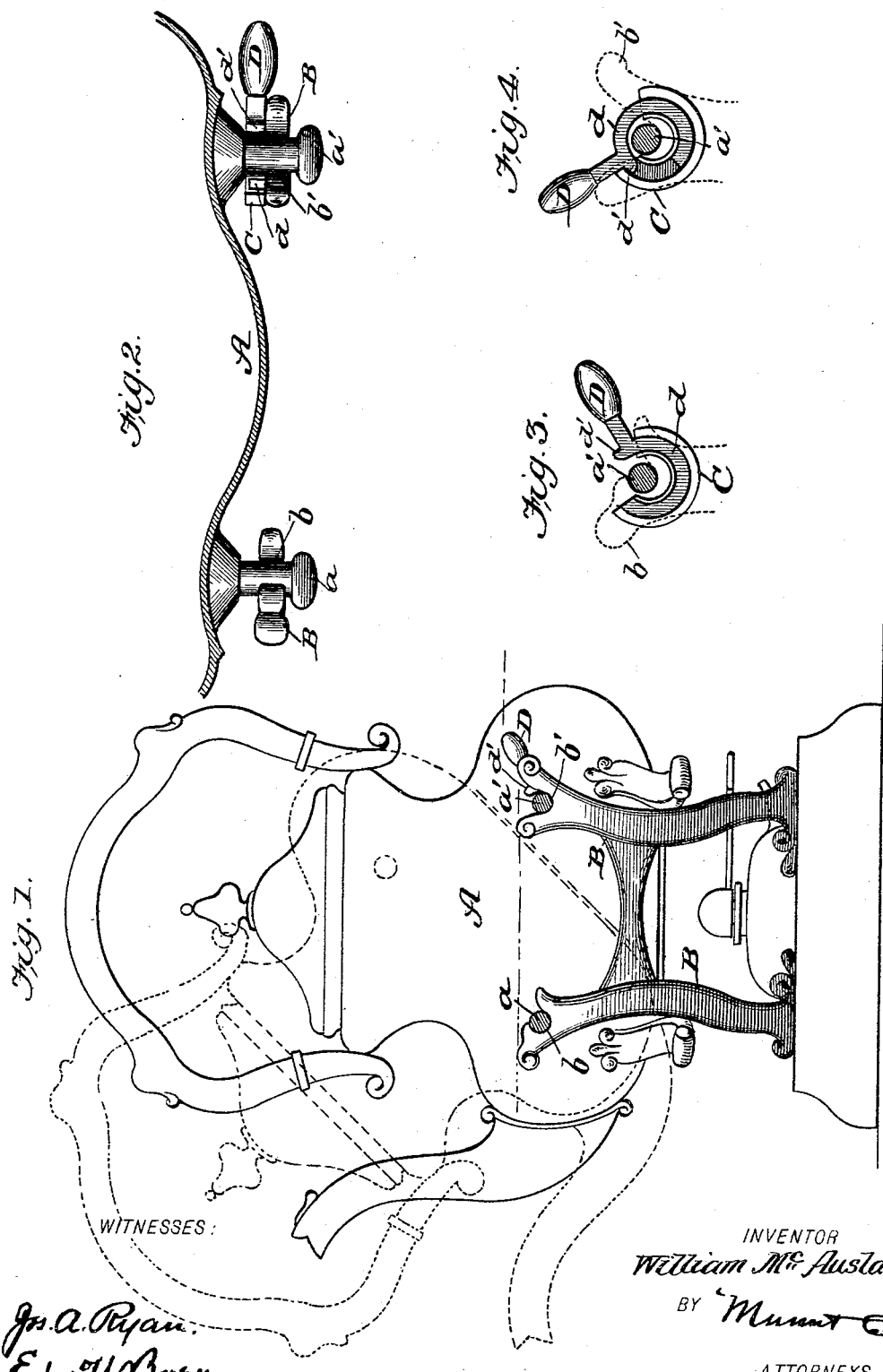
INVENTOR
William McAusland,
BY Munn & Co.
ATTORNEYS.
WITNESSES:
Jos. A. Ryan.
Edw. H. Byrn.

UNITED STATES PATENT OFFICE.

WILLIAM McAUSLAND, OF TAUNTON, MASSACHUSETTS, ASSIGNOR TO THE REED & BARTON CORPORATION, OF SAME PLACE.

TEA-KETTLE, &c.

SPECIFICATION forming part of Letters Patent No. 638,641, dated December 5, 1899.

Application filed August 4, 1899. Serial No. 726,126. (No model.)

*To all whom it may concern:*

Be it known that I, WILLIAM MCAUSLAND, of Taunton, in the county of Bristol and State of Massachusetts, have invented a new and useful Improvement in Tea-Kettles, &c., of which the following is a specification.

My invention relates to tea-kettles, coffee-urns, water-pitchers, and similar vessels which are arranged to tilt upon trunnions or other supports in pouring; and its object is to provide a vessel of this class which while free to tilt in its frame when on the table and in condition for pouring may be locked on its tilting supports, so that in transporting the device it may be conveniently carried by its own bail with its subjacent supporting-frame instead of having to carry it by its supporting-frame, which is both an awkward operation and one liable to tilt and spill the contents of the tilting pot.

Figure 1 is a side view of a tilting kettle with my invention applied. Fig. 2 is a sectional plan view of one side. Fig. 3 is a detail side view of the locking device open, and Fig. 4 a similar view of the same closed.

A is the tilting pot, having two trunnions $a$ and $a'$ on each side resting in seats $b\ b'$ in the supporting-frame B and adapted to be tilted thereon, as indicated in dotted lines. The forward seats $b$ are arranged to extend up in front and slightly over the tops of the forward trunnions $a$, so that the trunnions cannot come out by a direct vertical movement, but have to be inserted and removed by an oblique motion. The rear seats $b'$ for the trunnions open vertically, but have beside them a locking-catch. (Shown in detail in Figs. 3 and 4.) This consists of a circular housing or case C, having a circular annular passage-way opening at each end on opposite sides of the trunnion-seat and containing a curved circular sliding locking-bolt $d$, having a projecting handle D. This handle is near one end of the locking-bolt and projects radially therefrom, but has on one side a portion of the locking-bolt $d'$ projecting beyond the handle far enough to enter the annular passage-way, and thus lock the upper end of the bolt when the handle is thrown forward, as in Fig. 4. When the handle is thrown into this position, the rear trunnion is completely inclosed and locked by the bolt $d$, and as the forward seat will not allow its trunnion to rise in a vertical path it will be seen that the kettle and the frame B are rigidly locked together, and the kettle and its supporting-frame may both be carried by the bail of the kettle.

I am aware that a tilting vessel has been arranged on two trunnions on each side, one of which was arranged in wholly-inclosed bearings and the other in open bearings to permit tilting, and that a rotary sliding journal-lock is also not broadly new. My invention is distinctive in that the trunnion-bearings on both sides are open, so that the kettle can be entirely removed from its bearings and yet is capable of being locked in both front and rear bearings by a single locking-bolt and a single adjustment. For this purpose the front trunnion-bearings have an upwardly-projecting and overhanging extension, which when the rear bearings are open allows the kettle to be removed bodily from its bearings and yet locks the front bearings whenever the rear ones are locked. My invention is also distinctive in the special form and arrangement of the rotary locking-bolt in relation to the other parts.

Having thus described my invention, what I claim as new, and desire to secure by Letters Patent, is—

1. The combination with a supporting-base having two open trunnion-seats on each side, the front ones extended up and partially over the position of the trunnions; of a receptacle having two trunnions on each side, and a locking device arranged to secure one of the rear trunnions in its seat substantially as described.

2. The combination with a supporting-frame having on each side two open trunnion-seats with an overhanging extension for the front seats; of a tilting receptacle having on each side two trunnions mounted therein, and a casing connected to the supporting-frame at the rear trunnion-seats and having a circular channel-way partially inclosing the trunnion-seat, and a circular rotary sliding locking-bolt arranged therein to inclose the trunnion and having a handle substantially as and for the purpose described.

3. The combination with a supporting-frame having on each side two open trunnion-seats with an overhanging extension for the front seats; of a tilting receptacle having on each side two trunnions mounted therein, a casing connected to the supporting-frame and having a circular channel-way partially inclosing the rear trunnion-seat, and a circular rotary sliding locking-bolt arranged therein and provided with a handle located some distance from the end of the bolt to permit the latter to project far enough to enter the channel-way when in locked position substantially as described.

WILLIAM McAUSLAND.

Witnesses:
THEO. P. HALL,
HERBERT O. WOOLLEY.